United States Patent
Guionnet et al.

(10) Patent No.: US 11,470,545 B2
(45) Date of Patent: Oct. 11, 2022

(54) METHOD FOR SETTING PARAMETERS OF A VIRTUAL SUBSET OF A NETWORK DEDICATED TO A SERVICE

(71) Applicant: ORANGE, Issy-les-Moulineaux (FR)

(72) Inventors: Chantal Guionnet, Chatillon (FR); Jean-Philippe Lefaucheux, Chatillon (FR); Catherine Benguigui, Chatillon (FR); Sylvie Jumpertz, Chatillon (FR); Delphine Guegan, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 10 days.

(21) Appl. No.: 17/271,856

(22) PCT Filed: Aug. 30, 2019

(86) PCT No.: PCT/FR2019/052002
§ 371 (c)(1),
(2) Date: Feb. 26, 2021

(87) PCT Pub. No.: WO2020/043994
PCT Pub. Date: Mar. 5, 2020

(65) Prior Publication Data
US 2021/0204208 A1    Jul. 1, 2021

(30) Foreign Application Priority Data
Aug. 31, 2018 (FR) ...................................... 1857850

(51) Int. Cl.
*H04W 48/18* (2009.01)
*H04W 4/02* (2018.01)
(Continued)

(52) U.S. Cl.
CPC ........... *H04W 48/18* (2013.01); *H04W 4/026* (2013.01); *H04W 24/04* (2013.01); *H04W 48/16* (2013.01)

(58) Field of Classification Search
CPC ..... H04W 48/18; H04W 4/026; H04W 24/04; H04W 48/16
See application file for complete search history.

(56) References Cited

U.S. PATENT DOCUMENTS

2019/0253962 A1   8/2019  Kiessling et al.
2021/0204208 A1*  7/2021  Guionnet .............. H04W 24/04

FOREIGN PATENT DOCUMENTS

FR      3052324 A1    12/2017
WO   2017143047 A1     8/2017
WO   2017218849 A1    12/2017

OTHER PUBLICATIONS

English translation of the Written Opinion of the International Searching Authority dated Nov. 22, 2019 for corresponding International Application No. PCT/FR2019/052002, filed Aug. 30, 2019.
(Continued)

*Primary Examiner* — Julio R Perez
(74) *Attorney, Agent, or Firm* — David D. Brush; Westman, Champlin & Koehler, P.A.

(57) ABSTRACT

A method for adjusting parameter values for a virtual subset of a network called "network slice," dedicated to a service, where the method includes driving a graphical interface in which polar coordinates are associated with each of the parameters for the network slice, with an angular coordinate assigned to one parameter and a radial coordinate assigned to the value of that parameter.

9 Claims, 3 Drawing Sheets

(51) Int. Cl.
  *H04W 24/04*  (2009.01)
  *H04W 48/16*  (2009.01)

(56) References Cited

OTHER PUBLICATIONS

International Search Report dated Nov. 13, 2019 for corresponding International Application No. PCT/FR2019/052002, Aug. 30, 2019.
Written Opinion of the International Searching Authority dated Nov. 13, 2019 for corresponding International Application No. PCT/FR2019/052002, filed Aug. 30, 2019.
Gsm Association, "An Introduction to Network Slicing" Nov. 17, 2017 (Nov. 17, 2017), pp. 1-20, Retrieved from the Internet: http://www.gsma.com/futurenetworks/wp-content/uploads/2017/11/GSMA-An-Introduction-to-Network-Sliving.pdf [retrieved on Oct. 26, 2018], XP055519364.

* cited by examiner

METHOD FOR SETTING PARAMETERS OF A VIRTUAL SUBSET OF A NETWORK DEDICATED TO A SERVICE

CROSS-REFERENCE TO RELATED APPLICATIONS

This Applications is a Section 371 National Stage application of International Application No. PCT/FR2019/052002, filed Aug. 30, 2019 the content of which is incorporated herein by reference in its entirety, and published as WO 2020/043994 A1 on Mar. 5, 2020, not in English.

BACKGROUND OF THE DISCLOSURE

The present disclosure relates to the field of telecommunication networks.

The architecture of mobile telecommunication networks was until now standardized. This is specifically the case of mobile networks called "2G," "3G," and "4G" whose various network architectures traditionally rest on equipment that is very specific and dedicated to certain precise functions, whether in the access network or core network.

The lack of flexibility and evolvability inherent in this type of conventional architecture led to considering the adoption of more flexible architectures for the next generation of mobile networks, called "5G," in order to be able to respond quickly to demands that are extremely diverse in terms of traffic or service quality.

Among the solutions considered, one solution rests on a technique of virtual segmenting by slices of the network ("network slicing").

The network slice concept is intended to support communications services for specific client services, specific users or specific terminals by applying suitable traffic management means.

A slice of the network is characterized by a set of network parameter values with which to address requirements related to the services to be provided. The network slices offered by an operator don't all have the same values of network parameters since the idea is to adapt the network architecture and slices to the usage requirements related to this network slice. In that way a slice of the network serves to satisfy the demand of users according to different functional, operational and performance criteria, such as data rate, latency, number of connections, coverage, cost, etc.

As an example, a network slice implemented related to IOT services ("Internet of Things") could require managing a large number of terminal connections but a fairly small data rate associated with each terminal. According to another example, a service offered to a professional clientele will instead require strong constraints in terms of safety and availability. The objective is to propose for a given network slice just the parameters indispensable to the use case corresponding to the network slice and suited parameter values.

However, all the parameters for network slices are more or less complexly connected with each other according to predetermined rules. In that way, if one parameter value for the network slice is changed, some values of other parameters could also be affected and therefore changed, resulting in some functional, operational and performance constraints for the user of the network slices. It is then difficult for the end user to determine, oversee or adapt the network resources that it needs.

The present disclosure aims to resolve, at least in part, these disadvantages.

SUMMARY

Embodiments of the present disclosure aim to allow a user to simply determine and know the various parameters of the network slice according to their needs, the values thereof and as necessary to modify them. That also allows them to see the impacts of variation of each of the parameter values on the other parameter values.

Some embodiments of the present disclosure relate to a method for adjusting parameter values for a virtual subset of a network, called "network slice," dedicated to a service, where the method comprises driving a graphical interface in which polar coordinates are associated with each of the parameters for the network slice, with an angular coordinate assigned to one parameter and a radial coordinate assigned to the value of that parameter, where the method includes:

acquisition of a plurality of input parameter values for a network slice;

distribution on the graphical interface of input parameter values with association of an angular coordinate dedicated to each input parameter with this input parameter and a radial coordinate that is an increasing function of the value of this input parameter; and changing a value of at least one first input parameter, and with that, of the radial coordinate associated with the first input parameter comprising:

estimating, based on predetermined rules, of one or more second input parameters depending on the modified value of the first input parameter;

changing radial components respectively associated with the values on the graphical interface of the one or more second parameters, depending on the estimated values of the one or more second input parameters; and applying the changed value of the first input parameter and the estimated values of the one or more second input parameters as output parameter values for the network slice.

Thanks to these provisions, a visual assistance results for understanding the connections between various parameters of the network slice, making it possible for the user to satisfactorily choose and manage the network slice dedicated to the service that the user needs. The user may in that way easily determine and change the parameters for the network slice by means of a specific representation or visual imprint.

According to an embodiment, the parameters for the network slice are selected from the data rate, geographic coverage, number of connections, security level, cost of the service, latency, service quality and frequency used by the network slice.

According to another embodiment, the polar coordinate associated with a parameter is fixed, advantageously equal to 360°/N, where N is the number of input parameters with which polar coordinates were associated.

According to another embodiment, the method comprises a distribution on the graphic interface of input parameter values proposed by the operator of the network slice.

According to another embodiment, changing the value of the first input parameter is done by a user by means of a human-machine interface.

According to another embodiment, changing the value of the first input parameter is done automatically in order to correspond to an actual value of the parameter from the network slice.

The various embodiments of the method may be implemented independently of each other or in combination with each other.

Embodiments of the present disclosure also relate to a system for adjusting parameter values for a virtual subset of a network, called "network slice," dedicated to a service, comprising:

at least one user terminal configured for implementing the adjustment method according to the present disclosure; and at least one access equipment associated with the configuration of the network slice configured for communicating with the user terminal.

According to an embodiment, the user terminal comprises a human-machine interface configured for allowing a user to change the value of the first input parameter.

Additional embodiments of the present disclosure relate to a program comprising program code instructions for execution of the adjustment method according to the present disclosure.

Finally, embodiments of the present disclosure also relate to a recording medium readable by a terminal on which the code instructions of a computer program according to the present disclosure.

BRIEF DESCRIPTION OF THE DRAWINGS

The features and advantages of embodiments of the present disclosure will appear more clearly, upon reading the description, given as an example, and figures relating to it which show.

DETAILED DESCRIPTION OF THE ILLUSTRATIVE EMBODIMENTS

Figure 1:
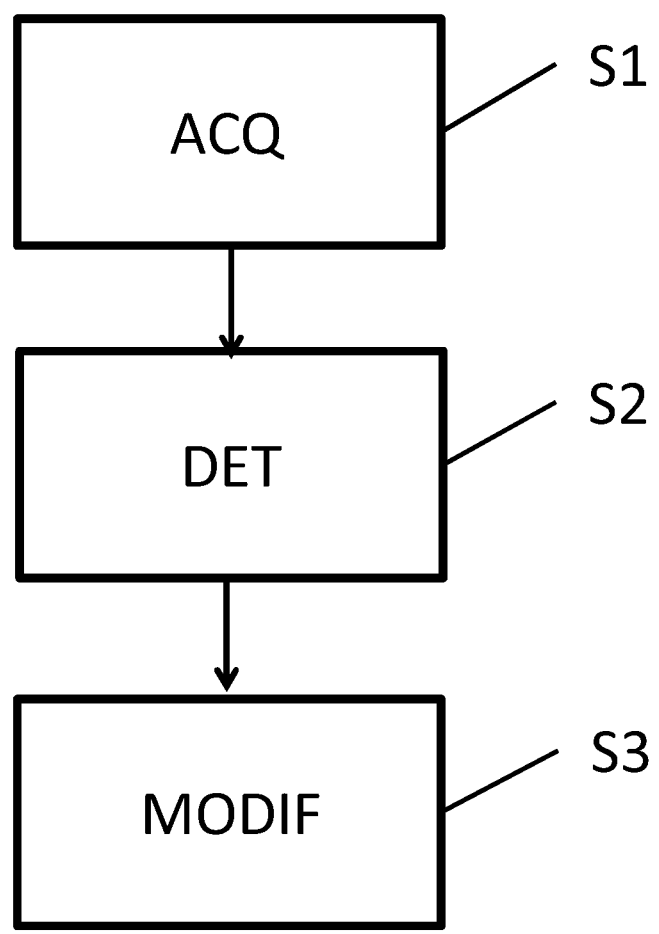
FIG. 1 is a simplified drawing of a method for adjusting parameter values of a virtual subset of a network according to embodiments of the present disclosure.

FIG. 1 shows a simplified drawing of a method for adjusting parameter values of a virtual subset of a network, called "network slice," according to embodiments of the present disclosure.

In order to avoid deploying physical equipment for each need of a client or a user, an operator may advantageously use virtualized functions for implementing a network slice, making it possible to deploy just one physical infrastructure and to activate several network slices on this physical infrastructure. The operator can therefore manage and operate several network slices on a single physical network infrastructure.

Such a virtual segmenting technique by network slices in that way serves to help the operator of the telecommunications network create "made-to-order" networks that are customizable by the user, and capable of quickly providing optimized solutions for very different needs with highly varied constraints in terms of functionality and performance.

Each network slice is suited to the specific needs of the service of the user. The network slices correspond to services in a broad sense. Thus, a network slice comprises a plurality of parameters. The service provided by the network slice can be defined by the parameters. The number of parameters presented can in particular vary according to the needs of the user, or according to the type of user (supervisor for the operator or client for example).

"Parameter" is understood to mean a characteristic whose value influences the service obtained by the user and therefore provided by the network slice.

According to an embodiment, a parameter relates to a technical function of the network slice. A parameter for a network slice may be selected from the data rate of the network slice D, the geographic coverage of the service, the number of possible connections, the security level S of the network slice, the latency L of the network slice, the service quality of the network slice and the frequency used by the network slice.

According to another embodiment, another parameter may also relate to a variable connected to the operational performance requirements specific to the user. A parameter for a network slice may be chosen from various requirements related to the service obtained by the user, such as the cost of service for the user, the energy impact of the service, the ecological impact, and the commercial impact expected by the user.

These examples parameters are not limiting. Further, a parameter may be chosen from a combination of a function of the parameters indicated above or even from other parameters not mentioned. As an example, the geographic coverage may be determined by a function depending on a plurality of values related to the geo-localization of the user.

The value of a parameter may advantageously be changed in order to correspond to the development of the needs of the user. As an example, the user may wish to get a service having a lower cost and a more restricted geographic coverage, in which case the values of these parameters would need to be reduced.

However, at the network level, the parameters are related to each other according to predetermined rules, such that the value of one parameter may depend on the value of one or more other parameters of the same network slice. The relation between the various parameters may in that way be defined by an adjustment function F connecting the various parameters with each other, such that:

$$F(P_i)=F(P_{i-1},P_{i-2},\ldots,P_{i+1},P_{i+2},\ldots)$$

According to an embodiment, the adjustment function F may incorporate rules or restrictions imposed by the network operator (such as minimum or maximum values) or dependent on the features of the network slice in order to limit the authorized values of parameters or the possibility of changing the value of a parameter, in particular in order to remain compatible with the service requested by the user.

According to another embodiment, the adjustment function F may also incorporate constraints related to the physical infrastructure that is necessary and available for responding to the characteristics of the network slice.

The present disclosure also aims to get a representation, also called visual imprint, of the parameters and the value of the parameters for the network slice by means of a graphical interface. More specifically, the graphical interface is configured for being driven as a function of the variation of the values of the parameters for the network slice. The user can in that way visualize the representation in order to know the state or development of the parameters for the network slice.

The method for adjusting, or configuring, parameter values for the network slice for driving the graphical interface is described below.

In a first step of the method S1, a plurality of input parameter values for a network slice is acquired.

The input parameters define the service provided by the network slice in an initial state. As an example, the operator may decide to provide particularly high input parameter values as it relates to security, number of connections or geographic coverage for a professional clientele. Inversely, the values of these input parameters are low for a user wishing to pay a smaller price for the service provided by the network slice.

The values of the input parameters can thus be adapted to a service type provided by the operator.

According to an embodiment, the input parameter values are proposed by the network operator. The input parameter values may thus correspond to a specific service. For illustration, for an IOT service, the number of connections is predefined to correspond to a high number in order to be able to have a large number of terminals communicate with each other.

According to another embodiment, the input parameters may be initially defined by the user, in particular at the beginning of operation of the service.

In a second step of the method S2, polar coordinates are associated with the input parameters.

The polar coordinates are distributed in a common reference frame. The common reference frame is advantageously a polar reference frame, comprising a central point O. More specifically a polar coordinate and a radial coordinate are associated with each input parameter. Although the polar coordinates are distributed in the same frame of reference, the scale associated with each of the radial coordinates can be different in particular in order to reflect the relative amplitude difference between the values of the input parameters.

The angular coordinate is assigned to the input parameter and the radial coordinate is assigned to the value of this input parameter.

The radial coordinate of a parameter is advantageously variable between a minimum value $A_{min}$ and a maximum value $A_{max}$. The radial coordinate associated with an input parameter is an increasing function of this input parameter.

According to an embodiment, the radial coordinate may vary continuously between the minimum value $A_{min}$ and the maximum value $A_{max}$. In a variant, the radial coordinate may vary alternately between two values or may vary between several discrete values. More generally, the radial coordinate for an input parameter may vary continuously or discreetly.

The angular coordinate is advantageously fixed for each input parameter. In particular, the polar coordinates of a parameter is equal to 360°/N, where N is the number of input parameters with which polar coordinates had been associated. Each input parameter thus corresponds to a different polar coordinate, where the polar coordinates are advantageously uniformly distributed in the polar reference frame.

According to an embodiment, all input parameters for the network slice are associated with polar coordinates. In a variant, only certain input parameters for the network slice are associated with polar coordinates. More generally, the number of input parameters associated with polar coordinates depends on the preferred complexity of the graphical interface used, in particular depending on the needs of the user. The graphical interface can in that way implement a smaller or larger number of input parameters. The graphical interface may also offer the selective representation of a single parameter or a limited number of parameters, for example by means of filters to be activated or deactivated on the graphical interface.

Figure 2:
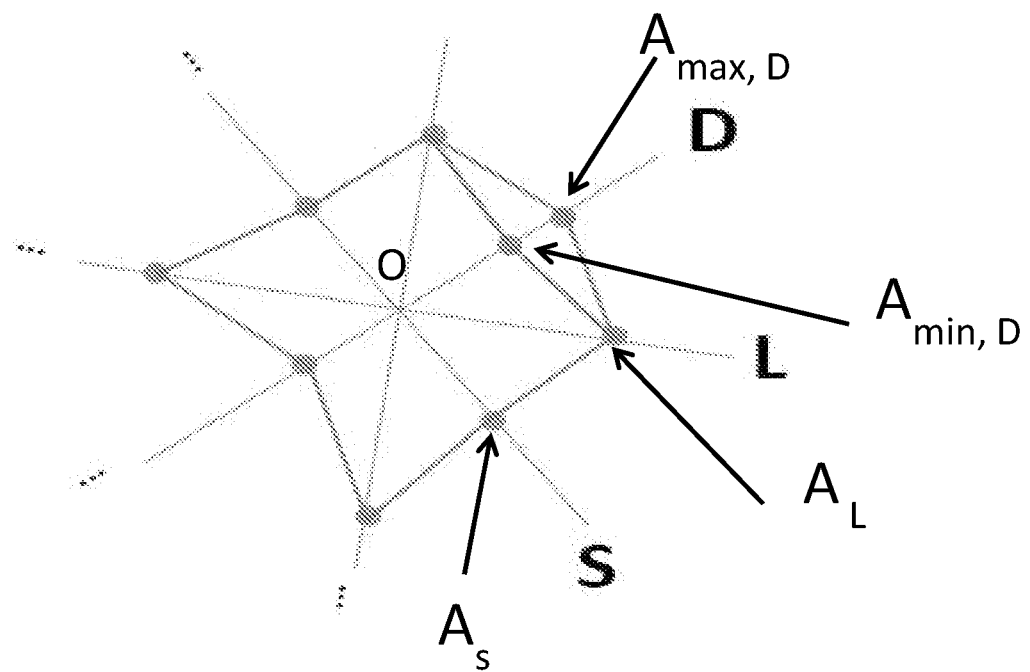
FIG. 2 is a representation of the input parameters of a network slice by means of a graphical interface according to embodiments of the present disclosure.

FIG. 2 thus shows a representation in which polar coordinates are associated with eight input parameters for a network slice, where three input parameters are identified as the data rate D, the latency L or the security S. The values of the latency L and security S parameters are represented by their respective radial coordinates $A_L$ and $A_S$. The minimum and maximum values of the data rate D parameter are represented by their respective radial coordinates $A_{D\ min}$ and $A_{D\ max}$.

As shown by FIG. 2, it is in that way possible to determine the values of the input parameter by means of the graphical interface because of the association thereof with the polar coordinates.

In that way, the method provides a visual representation, typically shaped like stars or spiderwebs, of the input parameters for the network slice. The representation comprises N branches, where each branch corresponds to an input parameter. Each branch extends radially from the central point O of the common frame of reference.

According to an embodiment, the graphical interface may also comprise text with which to indicate other information useful for understanding the representation by the user.

However, the input parameters, defining the service provided by the network slice in the initial state, could be changed.

In fact, the parameters for the network slice can be changed because of changes inherent in the actual capabilities of the physical infrastructure of the network. Further, for various reasons, the user may themselves wish to change the service provided for them by the network slice by changing one or several values of associated parameters.

Thus, in a third step of the method S3, a value of at least one first input parameter is changed, and with that the radial coordinate associated with the first input parameter.

According to an embodiment, changing the value of the input parameter is done automatically.

Automatically is understood to mean the user does not need to change the value of the first input parameter for the network slice himself. The value of the first input parameter may be changed in order to correspond to the actual value of this parameter, meaning the value actually provided by network slice as implemented. The value of the first input parameter thus changes continuously, and advantageously in real time. "In real time" is understood in particular to mean during the use of the service by the user.

Since the value of the first input parameter is changed automatically, the associated radial coordinate is also changed. The user in that way sees the representation change with changes of the value of the first input parameter for the network slice. In that way a dynamic visual imprint results.

As an example, if the latency L of the network slice varies, then the radial coordinate associated with this first input parameter is changed in the graphical interface in order to correspond to the actual latency value of the network slice. According to the embodiment from FIG. 2, the user then sees the radial coordinate $A_L$ change by moving towards or away from the central point O, while advantageously the angular coordinate for this parameter is unchanged.

According to another embodiment, the user themself changes the value of the first input parameter by means of the graphical interface. The user can in that way view the input parameters, in particular their polar coordinates, and decide to change a radial component and in with that, the value of the associated input parameter.

For this purpose, the human-machine interface may allow the user to interact with the graphical interface in order to change the radial coordinate of an input parameter.

As an example, the user may wish to change the data rate D that they want to get for the service provided by the network slice, and may therefore decide to adjust the radial coordinate $A_D$ associated with the data rate.

Since the parameters for the network slice are connected to each other by the adjustment factor F, the variation of a radial coordinate of a first input parameter leads to the change of one or more other radial coordinates, and with that, one or more second parameters for the network slice.

Figure 3:
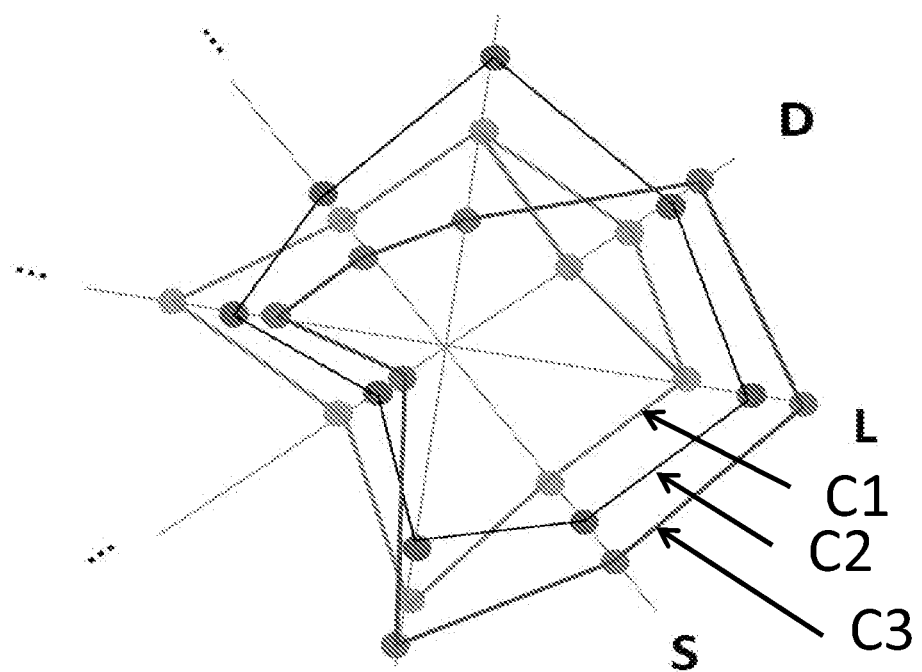
FIG. 3 is a representation of the parameters of a network slice by means of the graphical interface from FIG. 2 according to embodiments of the present disclosure.

As an example, changes to the polar coordinates associated with the data rate D may lead to changes in the polar coordinates associated with the latency L or the security S. FIG. 3 shows the graphical interface from FIG. 2 on which the contour C1 represents the polar coordinates of the input parameters connected to each other. The contour C2 represents the polar coordinates of these input parameters after the user has changed the radial coordinate associated with the data rate D, and in which the values the other parameters have consequently also been changed.

The representation of the parameters from the network slice has thus changed, in particular by deforming, visually translating the adaptation of the network slice as a function of the change of the first input parameter.

In that way changed values of the first input parameter and the second input parameters are obtained.

These values can then be applied to the network slice in the initial state as output parameter values in order to get a network slice in a final state. The service provided by the network slice in the final state is thus adjusted for corresponding to the requirements of the user. Using the graphical interface, the user can get a representation, also called visual imprint, relating to the parameters of the network slice according to these output parameter values.

According to an embodiment, the representation can also display predetermined values or values proposed by the operator for the user's service. These values may be associated with models of network slice parameters for a given service, or also with predicted values according to parameters of the network slice or other external parameters. As shown in FIG. 3, the contour C3 represents polar coordinates of parameter values proposed by the operator, advantageously in real time.

The contours C1, C2 and C3 thus together form a spider-web type representation.

Figure 4:
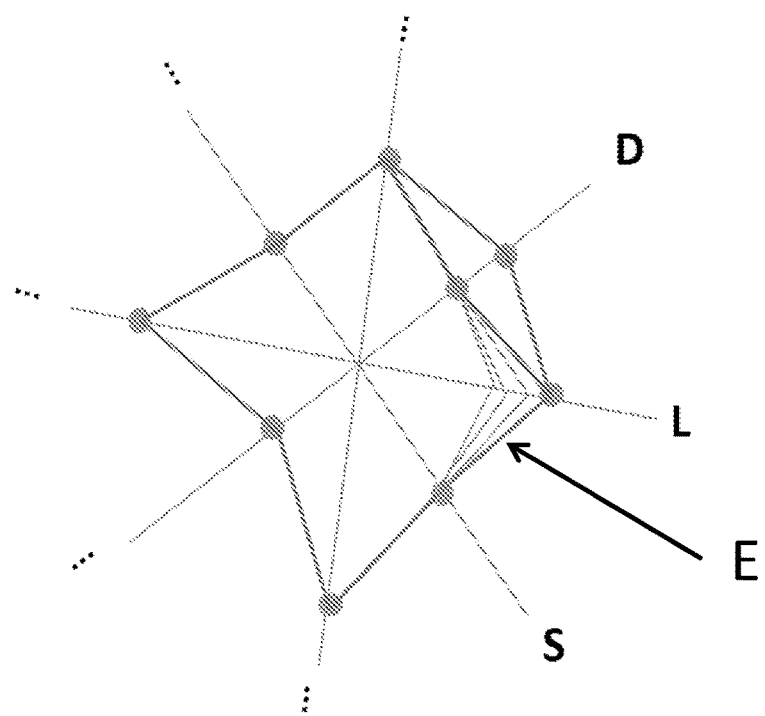
FIG. 4 is a representation of the parameters of a network slice by means of the graphical interface from FIGS. 2 and 3 according embodiments of the present disclosure.

According to another embodiment, the representation may show the elasticity potential of the value of an input parameter. "Elasticity potential" in particular is understood to mean in particular the capacity for variation of one parameter according to the change of another parameter. In particular, FIG. 4 shows the elasticity potential E of the value of the elasticity L.

Figure 5:
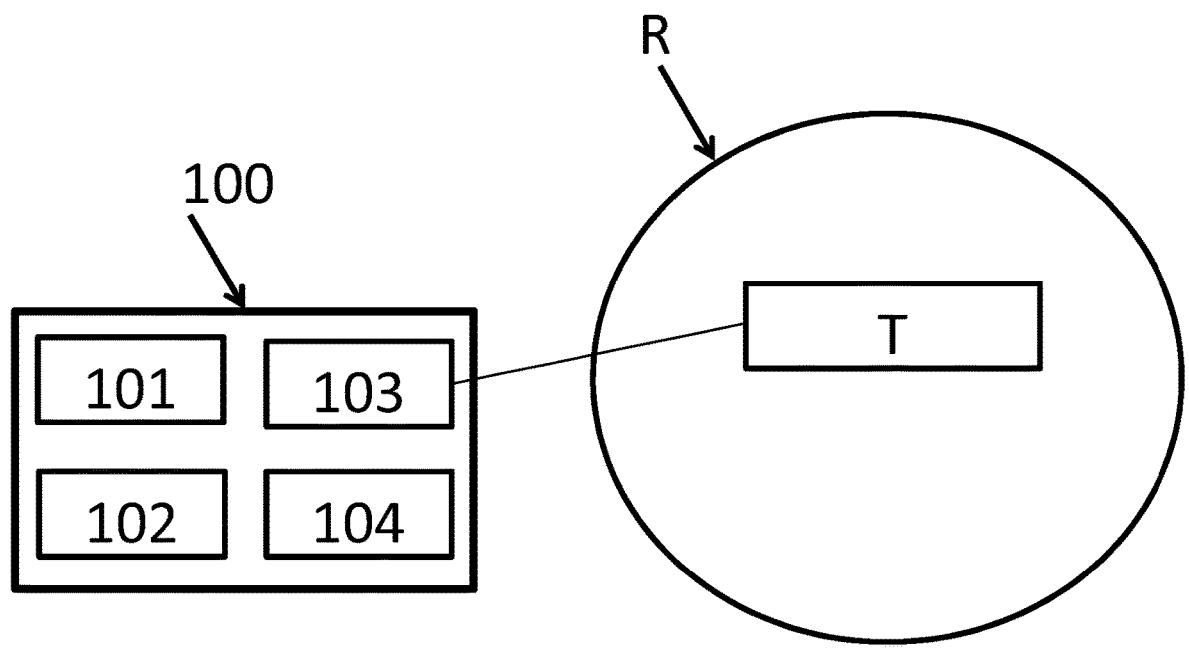
FIG. 5 is a simplified drawing of a terminal and access equipment associated with configuring the network slice according to embodiments of the present disclosure.

Now refer to FIG. 5, which shows the functions of a user terminal 100 configured for implementing various steps of the method for adjusting parameters for a network slice according to embodiments of the present disclosure.

A network R comprises the configuration of the network slice T associated with the user service.

The terminal 100 comprises a processing unit 101, equipped for example with a processor, driven by a computer program stored in the memory 102, and implementing the method of adjustment.

The processing unit 101 may serve to implement a predictive algorithmic calculation or artificial intelligence in order to estimate values for the two input parameters, such as described above.

The user terminal 100 further comprises a module 103 for transmission towards or receiving from access equipment associated with the configuration of the network slice T. The transmission/receiving module 103 thus serves to get parameter values for the network slice, and, after some output values of the parameters are determined, to send these output values to the access equipment in order to adapt the values of parameters for the network slice T.

The user terminal also comprises a human-machine interface 104 in order to allow the user to view the representation of the parameters, and as applicable, to manually change the radial coordinate of an input parameter.

The disclosure is not limited to the embodiments described and shown above, based on which other embodiments in other implementations could be anticipated without for that matter going outside the scope of the disclosure.

In particular, embodiments of the present disclosure can also apply to a temporal representation of the input parameter values for the network slice. According to this temporal representation, it is possible to visualize the changes in the radial coordinates associated with each input parameter as a function of time. Such a temporal representation also allows a retroactive analysis of the development of the parameters in order to allow a user to better control the changes in the service provided by the network slice.

As already indicated above, the user has a graphical interface and visual assistance in order to allow them to understand and control the existing dependencies between the parameters of the network slice.

The user may in particular compare the representation of the network slice in the initial state, corresponding to the input parameter values, with the representation of the network slice in the final state, corresponding to the output parameter values. The user may possibly compare these representations with other representations corresponding to other parameter values, for example recommended by the operator.

When parameters are changed automatically, the user can view the development of the representation, advantageously in real time, in order to understand the general trends specific to the network slice.

Although the present disclosure has been described with reference to one or more examples, workers skilled in the art will recognize that changes may be made in form and detail without departing from the scope of the disclosure and/or the appended claims.

The invention claimed is:

1. A method for adjusting values of a plurality of parameters for a virtual subset of a network, called "network slice," dedicated to a service, where the method comprises driving a graphical interface in which respective polar coordinates are associated with each of the plurality of parameters for the network slice, with a respective angular coordinate being assigned to each of the parameters and a respective radial coordinate being assigned to the value of the respective parameter, where the method is implemented by a device and comprises:

acquiring a plurality of input parameter values for the network slice;

distributing on the graphical interface the input parameter values with association of the respective angular coordinate dedicated to each input parameter with the input parameter and the respective radial coordinate, which is an increasing function of the value of the input parameter; and changing the value of at least one first of the input parameters, and with that, of the radial coordinate associated with the first input parameter, comprising:

estimating, based on predetermined rules, values of one or more second input parameters depending on the changed value of the first input parameter;

changing the radial coordinates respectively associated with the values on the graphical interface of the one or more second parameters, depending on the estimated values of the one or more second input parameters; and applying the changed value of the first input parameter and the estimated values of the one or more second input parameters as output parameter values for the network slice.

2. The method according to claim 1, wherein the plurality of parameters for the network slice are selected from data rate, geographic coverage, number of connections, security level, cost of the service, latency, service quality and frequency used by the network slice.

3. The method according to claim 1, wherein the polar coordinate associated with a parameter is fixed, advantageously equal to 360°/N, where N is the number of input parameters with which polar coordinates were associated.

4. The method according to claim 1 comprising distributing on the graphic interface of input parameter values proposed by an operator of the network slice.

5. The method according to claim 1, wherein changing the value of the first input parameter is done by a user by using a human-machine interface.

6. The method according to claim 1, wherein changing the value of the first input parameter is done automatically in order to correspond to an actual value of the parameter from the network slice.

7. A system for adjusting parameter values for a virtual subset of a network, called "network slice," dedicated to a service, comprising:
at least one user terminal configured for implementing the adjustment method according to claim 1; and
at least one access equipment associated with the configuration of the network slice configured for communicating with the user terminal.

8. A user terminal comprising:
comprising a human-machine interface configured for allowing a user to change a value of a first input parameter;
a processor; and a non-transitory computer-readable medium comprising instructions stored thereon which when executed by the processor configure the user terminal to adjust values of a plurality of parameters for a virtual subset of a network, called "network slice," dedicated to a service, wherein the adjusting comprises driving the graphical interface in which respective polar coordinates are associated with each of the plurality of parameters for the network slice, with a respective angular coordinate being assigned to each of the parameters and a respective radial coordinate being assigned to the value of the respective parameter, and wherein the adjusting comprises:

acquiring a plurality of input parameter values for the network slice;

distributing on the graphical interface the input parameter values with association of the respective angular coordinate dedicated to each input parameter with the input parameter and the respective radial coordinate, which is an increasing function of the value of the input parameter; and changing the value of at least the first of the input parameters, and with that, of the radial coordinate associated with the first input parameter, comprising:

estimating, based on predetermined rules, values of one or more second input parameters depending on the changed value of the first input parameter;

changing the radial coordinates respectively associated with the values on the graphical interface of the one or more second parameters, depending on estimated values of the one or more second input parameters; and applying the changed value of the first input parameter and the estimated values of the one or more second input parameters as output parameter values for the network slice.

9. A non-transitory computer-readable medium storing code instructions of a computer program to execute a method of adjusting values of a plurality of parameters for a virtual subset of a network, called "network slice," dedicated to a service when the code instructions are executed by a processor of a device, wherein the adjusting comprises driving a graphical interface in which respective polar coordinates are associated with each of the plurality of parameters for the network slice, with a respective angular coordinate being assigned to each of the parameters and a respective radial coordinate being assigned to the value of the respective parameter, and where the adjusting comprises:

acquiring a plurality of input parameter values for the network slice;

distributing on the graphical interface the input parameter values with association of the respective angular coordinate dedicated to each input parameter with the input parameter and the respective radial coordinate, which is an increasing function of the value of the input parameter; and changing the value of at least one first of the input parameter, and with that, of the radial coordinate associated with the first input parameter, comprising:

estimating, based on predetermined rules, values of one or more second input parameters depending on the changed value of the first input parameter;

changing the radial coordinates respectively associated with the values on the graphical interface of the one or more second parameters, depending on estimated values of the one or more second input parameters; and applying the changed value of the first input parameter and the estimated values of the one or more second input parameters as output parameter values for the network slice.

* * * * *